Feb. 28, 1967  W. O. PURCELL ETAL  3,306,125
CONTROL SELECTOR
Filed May 2, 1963  2 Sheets-Sheet 1

INVENTORS
WILLIAM O. PURCELL
GEORGE LAMAR HARMON
BY
Julian L. Renfro
ATTORNEY

INVENTORS
WILLIAM O. PURCELL
GEORGE LAMAR HARMON
ATTORNEY

United States Patent Office 3,306,125
Patented Feb. 28, 1967

3,306,125
CONTROL SELECTOR
William O. Purcell, Orlando, and George Lamar Harmon, Winter Park, Fla., assignors to Martin-Marietta Corporation, Middle River, Md., a corporation of Maryland
Filed May 2, 1963, Ser. No. 277,621
8 Claims. (Cl. 74—471)

This invention relates to a control selector for transforming bi-directional motions of an operator's hand into electrical signals usable in control systems for missile guidance or the like, and more particularly to a control selector having a control stick mounted upon a resilient member rather than in the usual ball and socket joint, which member positively and rapidly centers the stick at all times when not deflected by the operator, thus to prevent the generation of undesired control signals.

In the past, a large number of control stick arrangements have been proposed, which have found widespread use not only for controlling aircraft, but also for enabling the pilot of an aircraft launching an air-to-air or air-to-surface missile to guide the missile to its target by appropriate movements of the control surfaces of the missile.

Although control selectors are available in a wide variety of designs, in our co-pending application entitled "Control System," filed in the U.S. Patent Office June 25, 1962 and bearing Serial No. 204,875, the technology involved placed very stringent requirements upon the control selector. In that invention, any continued deflection of the control selector from the neutral or zero deflection position causes a substantial input signal to the system. This is because in accordance with that invention, control signals are derived from a memory of the previous control stick movements, thus to bring about by the duration of time that the stick is deflected, the sending of control signals reflecting an anticipation of the next signal to be sent, which the operator would otherwise have to originate. By virtue of the memory aspect of that invention, after a short initial period of assuming control of the missile, the pilot is thereafter required only to originate trim commands rather than extensive missile controlling movements.

In view of it being imperative that the control selector used with such an invention be rapidly and accurately returned to the neutral position after each deflection thereof by the operator, the present invention was evolved, which advantageously employs a resilient means to support the control stick, with the free end of the stick being grasped by the operator in order to bring about controlled deflections from the neutral position. The resilient means advantageously functions to positively center the control stick in the zero deflection position rapidly upon being released.

At least two position transducers are disposed so as to be deflected by control stick movements, with one of the transducers being arranged primarily to sense stick movements in a first direction, and the other transducer being arranged to sense stick movements orthogonal to said first direction. Diagonal movements of the control stick may cause some degree of movement in each of the transducers, and upon said control stick being released, the resilient means, which may be a tightly wound spring, will return the stick to the neutral position in which the output of the position transducers will be returned to an electrically zero position.

These and other objects, features, and advantages of this invention will be more apparent from a study of the drawings in which.

Figure 1:
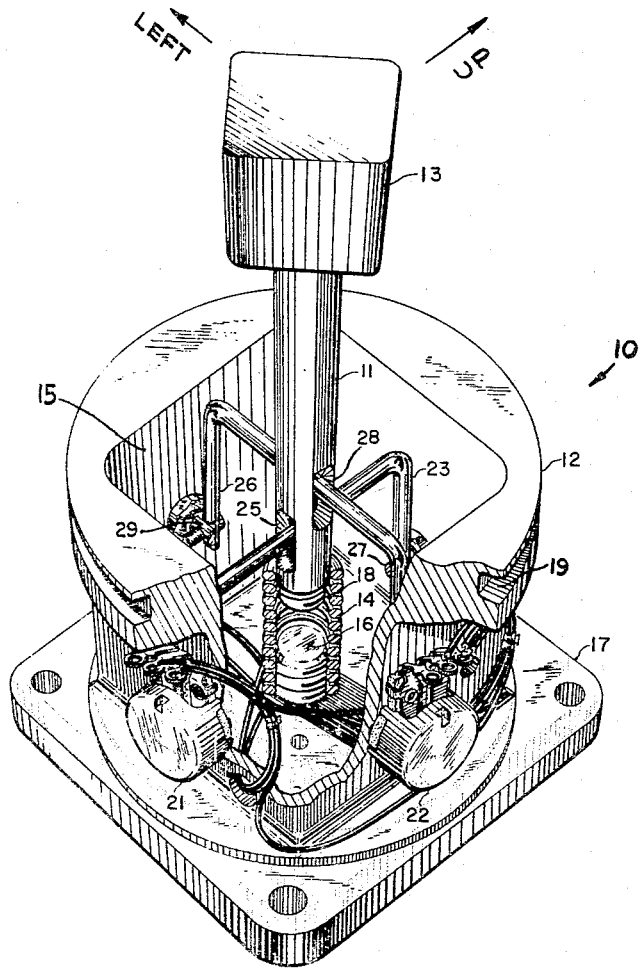
FIGURE 1 depicts a perspective view of a control selector in accordance with this invention, with portions thereof removed so as to reveal internal construction.

Turning to the drawings and referring first to FIGURE 1, control selector 10 principally comprises a control stick 11 movable with respect to housing 12 at the behest of the pilot or operator, who grasps knob 13 of the control stick in order to accomplish right-left or up-down type motions of the control stick. It should be noted that control stick 11 significantly is not supported from a ball joint or the like, but rather is supported by a resilient member such as coil spring 14 whose end remote from the control stick is supported in a central portion of cavity 15 in housing 12.

Figure 3:
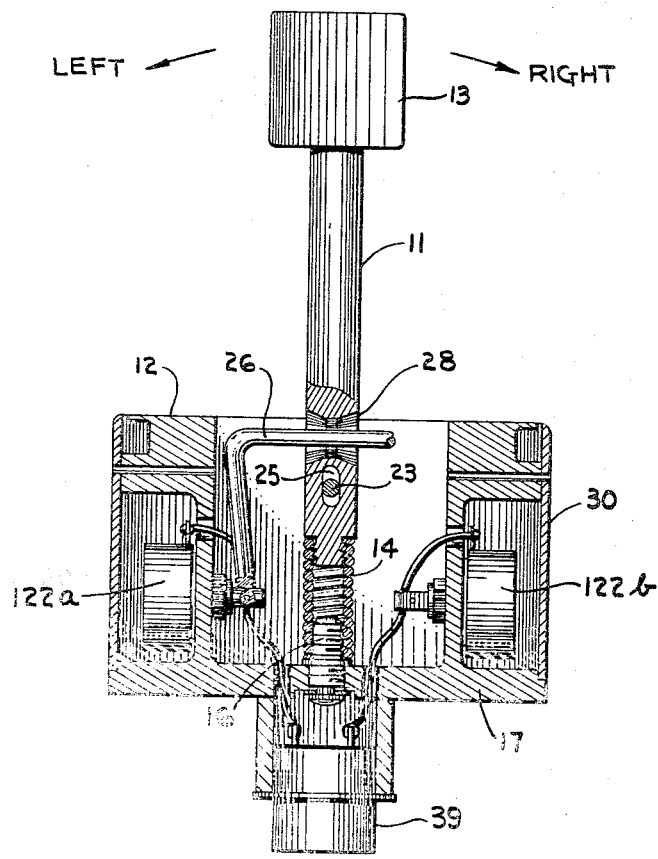
FIGURE 3 represents a side elevational view of our device, with portions removed to reveal internal construction, such as the resilient member.

As revealed in perhaps greater detail in FIGURE 3, the spring 14 is basically a tension type spring whose coils are comparatively closely wound, and which has sufficient resilience to normally maintain control stick 11 in the center of cavity 15, in what may be regarded as the zero deflection position. Bolt 16 is revealed in FIGURE 3 to extend vertically upwardly through the bottom 17 of housing 12 to form a support for spring 14. Bolt 16 may be equipped with two sets of threads, one set to threadedly engage the base 17 and the other set to interfit with the inner convolutions of the spring 14 so that the spring can be firmly supported in the upright position.

Similarly, the bottom portion of stick 11 may be provided with threads which are of the pitch appropriate to engage the upper convolutions of spring 14 so that stick 11 will normally be held in a vertical position with respect to base 17 when the operator is not grasping the knob 13. As should therefore be abundantly apparent, spring 14 not only serves to mount the stick 11 in the basic zero deflection position, but also it serves to positively recenter the stick in the zero position immediately after any deflection thereof by the operator in order to bring about a desired deflection of the control surfaces of the missile or the like.

As revealed in FIGURE 1, a pair of position transducers 21 and 22 are provided in housing 12, which as illustrated may be potentiometers. The movable or active portions of these devices, i.e. the potentiometer shafts for example, are mechanically connected to control stick 11, with the electrical outputs of the potentiometers being utilized to modulate the output signals to the control surfaces. One arrangement for mechanically connecting the position transducer 21 to stick 11 involves the use of a generally U-shaped bracket 23, the arms of which are connected to the control shaft of the transducer on the one hand, and to a pivot point 27 on the side of housing 12 diametrically opposite the transducer 21. The arm adjacent the potentiometer is tightly secured to the shaft of the potentiometer so that all movements of the bracket 23 as a result of stick motion will cause rotation of the potentiometer shaft in one direction or the other.

As is apparent from FIGURE 1, an enlarged hole 25 is disposed through a lower portion of stick 11, through which bracket 23 extends. As a result of this construction, if stick 11 is moved for example to the left as shown in FIGURE 1, this causes bracket 23 to move so as to cause the shaft of left-right potentiometer 21 to rotate in the counter-clockwise position as viewed in FIGURE 1 from the rear side of this component. Obviously, stick deflection to the right will accomplish a clockwise movement of the potentiometer shaft.

Potentiometer 22 is associated with up-down motions of the control stick, and its deflections are brought about as a result of bracket 26, which is also U-shaped, with one arm of the bracket connected to the shaft of potentiometer 22, and the other arm connected to pivot point 29 on the side of the housing diametrically opposite potentiometer 22. Bracket 26 extends through enlarged hole 28 provided through stick 11 at a 90° angle with respect to hole 25, with both of these holes being sufficiently elongated to permit motion of stick 11 that will not be inhibited by the brackets 23 and 26. As will be obvious, motion of knob 13 in the up direction will cause the shaft of potentiometer 22 to turn in a clockwise direction as viewed from the rear side of this component in FIGURE 1, whereas motion of stick 11 in the opposite direction will of course bring about rotation of the potentiometer shaft in the opposite direction.

It should be realized that by virtue of this arrangement, stick motions are not limited to the four cardinal directions, for manifestly neither the spring 14 nor the brackets restrict motion of the stick 1 to certain directions, in effect the stick having no fixed fulcrum. Rather, the aforementioned construction easily enables the stick 11 to be moved to positions intermediate two of the cardinal positions so that the operator can bring about combination movement of the control surfaces of the missile. Further, it should be noted that the use of the bracket arrangement enables a much more selective and precise deflection of the potentiometers than would be possible when the stick deflection is sensed at the fulcrum employed in many prior art devices.

Figure 2:
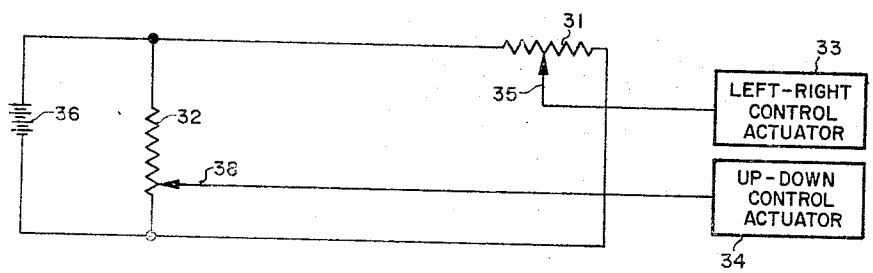
FIGURE 2 represents an electrical diagram revealing the use of a pair of position transducers moved as a result of control stick motion.

Turning to FIGURE 2, a control diagram is revealed in which the resistance windings 31 and 32 of potentiometers 21 and 22 are depicted as a part of the control circuit associated with control actuators 33 and 34, respectively, which may be servo mechanisms. As will be apparent, wiper 35 represents the output changing means of potentiometer 21, which is caused to move across resistance 31 as the shaft of this potentiometer is rotated. Battery 36 is provided for supplying a flow of current through resistance 31, with the position of wiper 35 with respect to resistance 31 of course controlling the level of the signal to the left-right control actuator so that appropriate movement of the control surface (not shown) associated with actuator 33 may for example be linearly brought about in the amount dictated by the position of the control stick.

Similarly, wiper 38 is movable across resistance 32 as a result of up-down movements of control stick 11, with the output signal flowing to up-down control actuator 34 reflecting the degree of up-down deflection of stick 11, so that a commensurate movement of the control surface will be brought about.

FIGURE 3 is illustrative of an embodiment of this invention in which four position transducers such as potentiometers are employed rather than the two described in conjunction with the embodiment set forth in FIGURE 1. Potentiometers 122a and 122b appear in this figure, which are utilized in lieu of the single potentiometer 22 of the embodiment of FIGURE 1, with two other potentiometers (not shown) being substituted for potentionmeter 21. Cylindrically shaped cover 30 is employed to protect these components against damage.

In this arrangement, each arm of the brackets 23 and 26 is supported by a shaft of a potentiometer, with no other support for the brackets being necessary. As in the previous embodiment, the brackets extend through respective holes in the stick 11, such as holes 25 and 28 illustrated in FIGURE 3 so that movements of the control stick in orthogonal directions or in directions intermediate the orthogonal directions may be brought about by the operator. The windings of the potentiometers are connected to a suitable electrical connector 39 disposed on the underside of housing 12, by means of which the control device may be connected to the control system of the aircraft or other instrumentality in which it is used. As in the previous embodiment, the spring 14 functions to maintain the control stick 11 in zero deflection position at all times when not manipulated.

Figure 4:
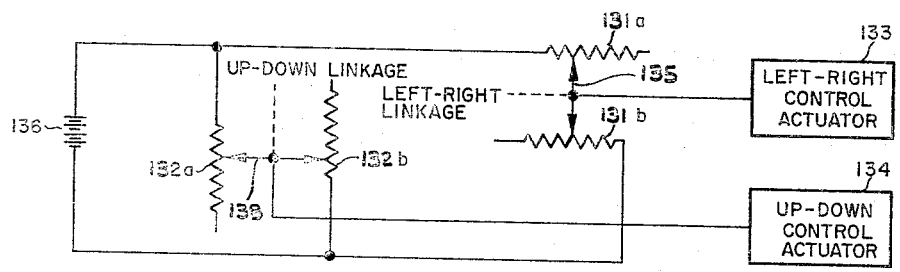
FIGURE 4 is an electrical diagram similar to FIGURE 2, but illustrating the utilization of four position transducers that are moved by the control stick to vary the signals to the control actuators.

Turning to FIGURE 4, a control diagram similar to that of FIGURE 2 is shown with the difference being in the utilization of the pair of potentiometer windings 131a and 131b in lieu of the single left right potentiometer winding 31 taught in the embodiment according to FIGURE 1, and the pair of up-down potentiometer windings 132a and 132b in lieu of up-down potentiometer winding 32. Although it would appear that this arrangement would entail more expense than that of FIGURE 1, such is usually not the case, for potentiometers 21 and 22 should have a resistance winding that extends approximately 45°, inasmuch as it is rare that stick 11 would be deflected more than that amount. However, most potentiometers have a resistance winding that extends for a greater amount than 45° in order that the potentiometer shaft may be rotatable for a much larger number of degrees, such as 350°. In order that comparatively inexpensive shelf-type potentiometers may be employed and yet have sufficient sensitivity for small control stick deflections, we provide the arrangement shown in FIGURE 4 in accordance with which a pair of left-right potentiometers and a pair of up-down potentiometers are each employed in a series arrangement, in which the resistance windings of the potentiometers are so to speak overlapped.

Operationally, this embodiment is virtually identical to the embodiment of FIGURE 2. For example, when as a result of stick motion wiper 135 is moved across resistance elements 131a and 131b, the electrical potential established at wiper 135 connecting these resistance elements will be proportional to the mechanical distance of the wiper from the closed ends of these windings. In this manner, a signal level is created that is identical with that developed across the single potentiometer winding 31 of FIGURE 2 upon the stick being deflected.

As will be apparent to those skilled in the art, the present invention may be effectively used in most linear proportional control systems, and is a considerable advance over the ball and socket joint type actuators of the prior art, which often tended to fail to return precisely to the zero deflection point, thus rendering them unusable for utilizations in which positive centering of the control stick is a stringent requirement.

We prefer the use of a corrosion resistant steel helical extension spring for the resilient member 14, which may have the following characteristics:

| | |
|---|---|
| Wire diameter, inches | .062 |
| Outside diameter of spring, inches | .625 |
| Inside diameter of spring, inches | .500 |
| Free length of spring, inches | 1 |
| Number of coils | 15 |
| Spring rate, lb./inches | 7 |
| Initial tension, lb. | 2.68 |

Although we have shown and described this invention in conjunction with a control surface actuator in which the use of such a spring is preferred for positive centering, it must be borne in mind that other resilient means, such as may involve the use of leaf springs or rubber may be employed for supporting and centering the stick, as may be required by the particular utilization of this invention.

Also, other transducers than potentiometers may be employed, such as resolvers, synchronous transformers, piezo electric devices, and the like, which vary electric circuit parameters as a result of stick motion.

This invention is not to be limited except as required by the scope of the appended claims.

We claim:

1. A control selector utilizing a control stick in which no fixed fulcrum is employed for its mounting, said control stick being adapted to be grasped by an operator and manipulated to various positions away from a zero deflection position, means for supporting said stick, including resilient means to which said stick is firmly attached, said resilient means forming the support for said stick and tending to hold said stick in said zero deflection position, a pair of position transducers, means forming an operative connection between said transducers and said stick so that said transducers will be deflected by such movements of said stick, one of said position transducers being mounted so as to primarily sense stick movements in a first direction, and the other transducer being mounted so as to primarily sense stick movements orthogonal to said first direction, said resilient means positively centering said stick so that said position transducers will be in the electrically neutral position at all times when the operator is not manipulating said stick.

2. The control selector as defined in claim 1 in which said resilient means is a tightly-wound coil spring.

3. A control selector utilizing a control stick in which no fixed fulcrum is employed for its mounting, which stick is arranged to modify electrical signals to control surface actuators or the like comprising a mounting base, a control stick adapted to be grasped by the hand of an operator, a coil spring, one portion of which spring is secured to said mounting base with the free end thereof attached to one end of said control stick to form the support for said stick, said spring being of a configuration as to support and maintain said control stick in a preselected attitude with respect to said mounting base, and to cause said stick to return to such attitude after being deflected away from such position by the operator, and a pair of position transducers mounted adjacent said control stick, means forming an operative connection between said transducers and said control stick so that motions of said control stick corresponding to up-down position-changes causes a first of said transducers to change electrical value, and motions of said control stick corresponding to left-right position changes causes the other of said transducers to change electrical value, with diagonal movements of said control stick causing some degree of movement in each of said transducers, each of said transducers being returned to the electrically neutral position upon said control stick being released.

4. A control selector utilizing a control stick in which no fixed fulcrum is employed for its mounting, comprising a housing, an elongated, tightly wound coil spring having one end thereof mounted in said housing, a control stick secured to the other end of said spring, said control stick being supported by said spring and being free to be manipulated by an operator, at least two rotary position transducers supported by said housing, means forming an operative connection between said transducers and said control stick so that the rotary positions thereof can be determined by positions of said stick, one of said transducers being rotatable in response to movements of said stick corresponding to left-right control movements and the other of said transducers having movements corresponding to up-down control movements, said stick, upon being released, being caused by said coil spring to return said position transducers to an electrically neutral position.

5. The control stick arrangement as defined in claim 4 in which said position transducers are electrically incorporated into respective units that serve as sources of variable electrical potential proportional to the deflection of said stick.

6. A control selector utilizing a control stick in which no fixed fulcrum is employed for its mounting, which stick is arranged to modify electrical signals to control surface actuators or the like comprising a control stick adapted to be grasped by an operator and manipulated to various positions away from a zero deflection position, means for supporting said stick, including resilient means to which said stick is firmly attached, said resilient means supporting said stick and tending to hold said stick in said zero deflection position, said control selector also having two pairs of position transducers, means forming an operative connection between said transducers and said stick such that said transducers will be deflected by such movements of said stick, one of said pairs of position transducers being arranged primarily to sense stick movements in a first direction, and the other pair of transducers being arranged to sense stick movements in a direction orthogonal to said first direction, said resilient means positively centering said stick so that said position transducers will be in the electrically neutral position at all times when the operator is not manipulating said stick.

7. The control selector as defined in claim 6 in which said resilient means is a tightly wound coil spring.

8. The control selector as defined in claim 6 in which generally U-shaped brackets are employed for transferring stick motions to said transducers, with the arms of each bracket being secured to said transducers to bring about motion of a respective pair of said transducers, and the base of each U-shaped bracket being disposed in an enlarged hole in said stick.

References Cited by the Examiner

UNITED STATES PATENTS

| | | | |
|---|---|---|---|
| 637,668 | 11/1899 | Rison | 287—86 |
| 1,523,401 | 1/1925 | Chamberlin | 287—86 X |
| 2,379,778 | 7/1945 | Allen. | |
| 2,427,008 | 9/1947 | Lee | 287—86 X |
| 2,595,282 | 5/1952 | Monchablon. | |
| 2,808,503 | 10/1957 | Ball | 287—86 X |
| 2,929,258 | 3/1960 | Mackway. | |
| 2,939,332 | 6/1960 | Peterson | 74—471 |
| 2,945,414 | 7/1960 | Blackstone | 88—1 |
| 3,027,801 | 4/1962 | Simmon. | |
| 3,156,134 | 11/1964 | Forrester | 74—471 |

FRED C. MATTERN, JR., *Primary Examiner.*

BROUGHTON G. DURHAM, *Examiner.*

C. F. GREEN, *Assistant Examiner.*